United States Patent
Milian et al.

(10) Patent No.: US 9,280,799 B1
(45) Date of Patent: *Mar. 8, 2016

(54) SYSTEMS AND METHODS FOR PROVIDING LEADS AND APPOINTMENTS

(71) Applicant: EducationDynamics LLC, Hoboken, NJ (US)

(72) Inventors: Roberto Milian, Boynton Beach, FL (US); Richard Capezzali, Boca Raton, FL (US)

(73) Assignee: EDUCATIONDYNAMICS LLC, Hoboken, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/842,334

(22) Filed: Sep. 1, 2015

Related U.S. Application Data

(63) Continuation of application No. 13/837,797, filed on Mar. 15, 2013, now Pat. No. 9,152,680.

(60) Provisional application No. 61/762,442, filed on Feb. 8, 2013.

(51) Int. Cl.
 G06F 17/30 (2006.01)
 G06Q 50/20 (2012.01)

(52) U.S. Cl.
 CPC ...... G06Q 50/2053 (2013.01); G06F 17/30867 (2013.01)

(58) Field of Classification Search
 CPC ............... G06F 17/30424; G06F 17/30864
 See application file for complete search history.

(56) References Cited

U.S. PATENT DOCUMENTS

| | | | |
|---|---|---|---|
| 6,052,122 A | 4/2000 | Sutcliffe et al. | |
| 6,058,367 A | 5/2000 | Sutcliffe et al. | |
| 6,266,659 B1 | 7/2001 | Nadkarni | |
| 6,385,620 B1 | 5/2002 | Kurzius et al. | |
| 7,194,481 B1 | 3/2007 | Van Roon | |
| 7,457,764 B1 | 11/2008 | Bullock et al. | |
| 7,502,748 B1 | 3/2009 | Baldwin et al. | |
| 2001/0039508 A1 | 11/2001 | Nagler et al. | |
| 2001/0042000 A1 | 11/2001 | Defoor, Jr. | |
| 2004/0197761 A1* | 10/2004 | Boehmer | G09B 3/00 434/362 |
| 2006/0161534 A1* | 7/2006 | Carson | G06F 17/30864 |
| 2010/0107060 A1* | 4/2010 | Ishizuka | G06Q 10/109 715/255 |
| 2011/0302159 A1* | 12/2011 | Mikesell | G06F 17/30386 707/723 |
| 2011/0306028 A1* | 12/2011 | Galimore | G09B 7/00 434/322 |
| 2012/0158422 A1* | 6/2012 | Burnham | G06Q 10/00 705/2 |
| 2014/0122595 A1* | 5/2014 | Murdoch | C03C 21/002 709/204 |
| 2014/0222482 A1* | 8/2014 | Gautam | G06Q 10/1095 705/7.19 |

FOREIGN PATENT DOCUMENTS

WO 9917242 4/1999

OTHER PUBLICATIONS

McGuire Joan M., et al., A Decision-Making Process for the College-Bound Student: Matching Learner, Institution, and Support Program, Learning Disability Quarterly, vol. 10, No. 2, Spring 1987.
Swigger, Keith, Enrollment Management in the Library School, Journal of Education for Library and Information Science, vol. 30, No. 4, Spring 1990.

* cited by examiner

*Primary Examiner* — Rehana Perveen
*Assistant Examiner* — Alexander Khong
(74) *Attorney, Agent, or Firm* — Amster, Rothstein & Ebenstein LLP

(57) ABSTRACT

Methods disclosed for lead generation relate to matching prospective applicants with educational institutions. Prospective applicants provide personal information and educational background information which are used to find matching educational institutions. Methods include enhancing connections between education institutions and prospective applicants by setting up mutually agree appointments. Systems and apparatuses are also disclosed to implement the disclosed methods.

14 Claims, 16 Drawing Sheets

Please input your information

Lead clicked "Yes"

Lead selects from among the available appointment dates and times.

Lead clicked "No"

Lead selects "No" and can advance to the last step. Appointment question is optional not required.

Thank you for making an appointment with us on February 5, 2013 at 2pm. Please expect a phone call from one of our advisors from the number 954-745-0079.

> ● I acknowledge that by scheduling an appointment, I will be contacted by telephone to discuss schools to which I am matched. If my appointment should be missed after a 26-hour period, my school matches will be automatically sent to the schools.

FIG. 6D

SYSTEMS AND METHODS FOR PROVIDING LEADS AND APPOINTMENTS

CROSS-REFERENCE TO RELATED APPLICATIONS

This application is a continuation of U.S. patent application Ser. No. 13/837,797, entitled "SYSTEMS AND METHODS FOR PROVIDING LEADS AND APPOINTMENTS" and filed Mar. 15, 2013, which in turn claims priority to U.S. Provisional Patent Application No. 61/762,442, entitled "SYSTEMS AND METHODS FOR PROVIDING LEADS AND APPOINTMENTS" and filed Feb. 8, 2013, the contents of these applications being incorporated herein by reference in their entirety.

FIELD

The present disclosure generally relates to systems and methods for matching applicants with educational institutions.

SUMMARY

In exemplary embodiments, a system and method for matching applicants with educational institutions comprises an appointment system further comprising one or more databases having institution data, user data, and other data. The appointment system may operatively connect to one or more institutions, one or more web properties, and one or more user devices.

In exemplary embodiments, institutions registering with the appointment system provide institution information, such as campus locations, tuition prices, offered programs, etc., and target applicant criteria information, such as, for example, GPA requirements, graduation year, geography, interests, etc. The appointment system obtains from the registering institutions appointment information, including, for example, available appointment times, locations, representatives information, campus information, programs, etc. The appointment system stores the data as institution information in one or more databases.

In exemplary embodiments, the appointment system receives an education match request from a user device, for example through an interface on the user device. The user may register with the appointment system by providing personal information, including name, address, age, background information, etc., and providing educational information, such as, the highest education degree completed, degree type, educational preferences, etc., which is received and stored as user information by the appointment system.

In exemplary embodiments, after receiving the user information, the appointment system accesses the institution information. Based at least in part on the received user information and accessed institution information the appointment system determines one or more matching institutions, if any, and stores a record of such matches. In exemplary embodiments, the matches determined by the appointment system may include one or more sponsored institutions prioritized for displaying to users. The matching results are provided to the user device.

After providing matches to a user device, the user may select one or more of the matches through the interface and select one or more options associated with the selected match, such as a specific program, an appointment time, etc. The appointment system receives the appointment selection and sends one or more notifications, including the details, location, directions, contact person(s) to the user device. The notifications may be in the form of emails, text messages, automated phone calls, and/or calendar appointments. In embodiments, after an appointment time period has been selected, the appointment system communicates to the user or user device information regarding the selected matching institution, for example, information regarding an institution's programs, tuition costs, campus information, location information, etc. In some embodiments, the appointment system may provide directions to the institution in the case of a scheduled face-to-face appointment.

In some exemplary embodiments, the appointment system provides an option and receives a request to connect with a contact person associated with selected matching institution. The appointment system in response can connect the user of the user device with a contact person through, for example, text messaging, instant messaging, phone calls, video chat, etc.

In exemplary embodiments, the appointment system collects data and statistics about the users of the appointment system which can be included in generated reports provided to the participating institutions.

According to exemplary embodiments, a method may include the steps of receiving, at one or more computers from a requestor device, a request for one or more educational institution matches; obtaining, at the one or more computers via an interface, user information associated with a user of the requestor device, the user information comprising (1) user identification data including information identifying the user; (2) demographic data including information identifying demographic data related to the user; (3) location data including information indicating one or more addresses associated with the user; (4) education data including information indicating educational background of the user; (5) education preference data including information indicating educational preferences for the user; and (6) contact data including information indicating contact information for the user.

The method may further include the steps of accessing, by the one or more computers, one or more electronic databases stored on one or more non-transitory computer-readable storage media and operatively connected to the one or more computers, the one or more databases comprising information for a plurality of educational institutions, including for the respective institutions: (1) user educational identification data including information identifying the user; (2) education location data including information identifying one or more locations associated with the respective educational institution; (3) education program data including information related to education programs associated with the respective educational institution; (4) education requirements data including information indicating admission requirements and admission preferences for respective educational institution; (5) representative data including information indicating representatives for the respective educational institution; and (6) appointment data including information indicating scheduled and available times; and the step of determining, by the one or more computers, based at least in part on the obtained user information, one or more educational institutions as matches.

Further, method may include the steps of providing, by the one or more computers, the one or more education institution matches as selectable options to the requestor device via the interface; transmitting, by the one or more computers to one or more computers associated with each of the matched educational institutions, a notification to each of the educational institution matches, the notification including a message indicating that the educational institution matches a prospect; obtaining, at the one or more computers from the requestor device via the interface, a selection of at an educational institution; determining, by the one or more computers, one or more available appointment times for the for the selected educational institution; obtaining, at the one or more computers, a selection of one or more appointment times for the selected educational institution; transmitting, by the one or more computers to one or more computers associated with the selected educational institution, a confirmation-seeking message requesting confirmation of the selected appointment time with a designated representative of the selected educational institution; obtaining, at the one or more computers, a message indicating confirmation of the appointment time by selected educational institution with a designated representative; and transmitting, by the one or more computers, a confirmation message to the requestor device confirming the date, time, location.

In some exemplary embodiments, the method may further include the steps of transmitting, by the one or more computers to the requestor device via the interface, directions to the selected educational institution; and transmitting, by the one or more computers, a request a third party service to cause a map illustrating the directions to be displayed on the interface on the requestor device.

In some embodiments, method may include the step of transmitting, by the one or more computer's to the requestor device, a reminder notification regarding the confirmed appointment.

The obtained user's education data may relate or include information regarding at least one of a high school, college, or postgraduate school attendance dates. The obtained user's data may relate or include information regarding one or more degrees completed by the user to the extent it exist. The education data may further include or indicate the user's grade point average in at least one of high school, college, or postgraduate school.

In some exemplary embodiments at least one of the provided education institution matches is sponsored match.

A method according to an exemplary embodiment of the present invention comprises: (a) receiving, at one or more computers from a requestor device, a request for one or more educational institution matches; (b) obtaining, at the one or more computers via an interface, user information associated with a user of the requestor device, the user information comprising (1) user identification data including information identifying the user; (2) demographic data including information identifying demographic data related to the user; (3) location data including information indicating one or more addresses associated with the user; (4) education data including information indicating educational background of the user; (5) education preference data including information indicating educational preferences for the user; and (6) contact data including information indicating contact information for the user; (c) accessing, by the one or more computers, one or more electronic databases stored on one or more non-transitory computer-readable storage media and operatively connected to the one or more computers, the one or more databases comprising information for a plurality of educational institutions, including for the respective institutions: (1) user educational identification data including information identifying the user; (2) education location data including information identifying one or more locations associated with the respective educational institution; (3) education program data including information related to education programs associated with the respective educational institution; (4) education requirements data including information indicating admission requirements and admission preferences for respective educational institution; (5) representative data including information indicating representatives for the respective educational institution; and (6) appointment data including information indicating scheduled and available times; (d) determining, by the one or more computers, based at least in part on the obtained user information, one or more educational institutions as matches; (e) providing, by the one or more computers, the one or more education institution matches as selectable options to the requestor device via the interface; (f) transmitting, by the one or more computers to one or more computers associated with each of the matched educational institutions, a notification to each of the educational institution matches, the notification including a message indicating that the educational institution matches a prospect; (g) obtaining, at the one or more computers from the requestor device via the interface, a selection of an educational institution; (h) providing, by the one or more computers to the requestor device, an option to schedule an appointment with a third party representative that is not affiliated with the selected educational institution; (i) receiving, at the one or more computers from the requestor device, a request to schedule an appointment with the third party representative; (j) determining, by the one or more computers, one or more available appointment times for the selected educational institution; (k) transmitting, by the one or more computers, a request to select one or more appointment times for the selected educational institution; (l) upon the condition that an appointment time is selected, transmitting, by the one or more computers to one or more computers associated with the selected educational institution, a confirmation-seeking message requesting confirmation of the selected appointment time with a designated representative of the selected educational institution; (m) obtaining, at the one or more computers, a message indicating confirmation of the appointment time by selected educational institution with a designated representative; (n) transmitting, by the one or more computers, a confirmation message to the requestor device confirming the date, time, location; (o) transmitting, by the one or more computers to the requestor device via the interface, directions to the selected educational institution; and (p) transmitting, by the one or more computers, a request to a third party service to cause a map illustrating the directions to be displayed on the interface on the requestor device.

DESCRIPTION OF THE DRAWINGS

The features and advantages of the present disclosure will be more fully understood with reference to the following, detailed description when taken in conjunction with the accompanying figure, wherein:

FIGS. 6A-6D show exemplary screenshots according to an exemplary embodiment of the present disclosure.

DETAILED DESCRIPTION

The disclosure generally relates to systems, methods, and program products for connecting potential applicants with institutions like educational institutions, vocational institutions, business institutions, etc., and arranging appointments. In exemplary embodiments, descriptive information regarding a plurality of institutions is obtained from such institutions, their agents, and/or third party sources and stored in databases. One or more of such institutions may also provide target information which can include applicant target criteria which identifies the desired applicants. Prospective applicants can provide institution target criteria regarding the applicants themselves and/or desired institutions. The system can then match the institution target criteria of the applicant with one or more matching institutions based at least in part on matching institution target criteria, institution descriptive information and/or applicant target information. In embodiments, institutions may be provided a preferred listing. The prospective applicant may then be provided with the ability to set up an appointment with the one or more identified institutions.

Figure 1:
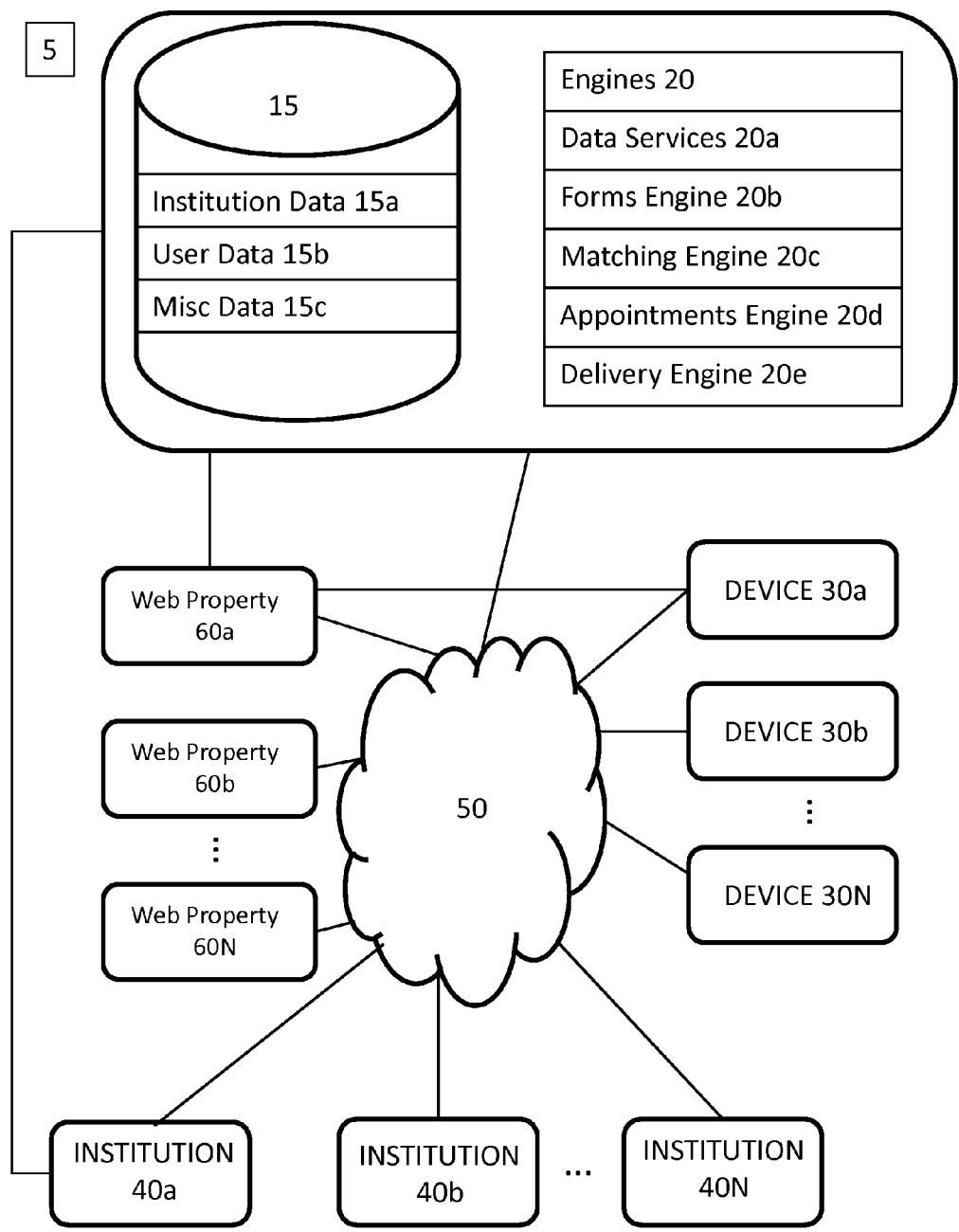
FIG. 1 is a system diagram illustrating an education appointment system operatively connected to one or more client devices and one or more educational institutions according to an exemplary embodiment of the present disclosure.

According to exemplary embodiments, FIG. 1, shows an appointment system, generally designated by number 5. The appointment system 5 may operatively connect to one or more user devices 30a . . . 30N associated with one or more users. The user devices may include devices such as, for example, a laptop, desktop, smartphone, Blackberry, iPhone, iPad, Surface Tablet, tablet device, iPod, Android device, Windows 8 device, and the like. In some exemplary embodiments, the user device 30 may be associated with the appointment system 5. For example, associated user devices may be owned, operated, or under the control of the appointment system 5 through a representative and/or employee of the appointment system 5. Such associated user devices may be customized with programs or functionalities described herein and may also include additional features, such as demos, presentations, videos, and the like, to induce people to use the appointment system 5 and find an educational match. In this regard, some associated devices are located remotely to the appointment system 5, such as in a mall, a kiosk, a park, a call center, or any suitable public or commercial place. In some exemplary embodiments, various aspects of the appointment system 5 may be implemented at one or more of the institutions.

In embodiments, user devices 30 may access the appointment system 5 through an interactive portal using a web browser without any additional or special software.

The appointment system 5 may be operatively connected to one or more institution systems 40a . . . 40N. The institution systems may include one or more computer systems associated with one or more institution parties, such as, for example, educational providers, businesses, organizations, and the like.

In exemplary embodiments, the appointment system 5, and by extension, any one of its components, may be operatively connected to one or more computer networks 50, such as, for example, WAN, LAN, phone, the Internet, or any other suitable network, via, by way of example, a set of routers and/or networking switches. The components of the appointment system 5 are shown to be located together in FIG. 1. It is to be understood that in embodiments the one or more components of the appointment system 5 may be combined or separated in any suitable manner. For example, one or more components may be located together on one or more computer systems that are operatively connected to other components of the appointment system 5.

In exemplary embodiments, the appointment system 5 includes and/or implements one or more engines 20 that may be implemented by one or more processors/computing devices associated with the appointment system 5. In this regard, the various aspects of the engines may be implemented as software, which may be stored on one or more non-volatile computer/processor readable storage media and implemented in one or more processors operatively connected thereto. In exemplary embodiments, each engine can be stored separately or in combination with one or more other engines on processor readable storage devices, which are operatively connected to one or more processors associated with the appointment system 5.

In exemplary embodiments, the appointment system 5 can include a data services engine 20a, a forms engine 20b, a matching engine 20c, an appointments engine 20d, and/or a delivery engine 20e, to name a few. For example, the data services engine 20a may implement processes relating to managing, maintaining, collecting, and/or securing access to configuration data for institutions and/or users. The forms engine 20b may implement processes relating to generating, providing, and/or displaying forms relating to institution and/or institutional offers. The matching engine 20c may relate to implementing processes for matching one or more institutions with one or more users. The matching engine 20c can implement business rules provided by the institution/organization during the matching processes.

The appointments engine 20d may relate to implementing processes for scheduling appointments and/or providing connections between users and institutions. The delivery engine 20e may implement processes for providing matching, appointment, and/or other information to the users and/or institutions.

In exemplary embodiments, the appointment system 5 may include one or more electronic databases 15, stored on one or more processor readable storage devices, which may be operatively connected to the one or more engines 20. The databases may include institution data 15a, user data 15b, and other data 15c, stored on one or more non-volatile computer storage readable media. The institution data 15a may include various information regarding the institution. For example, in the case where the institution is educational, e.g., a college and/or university, the institution data 15a may include the institution name, campus locations, schools, offered programs, business rules, fill orders, delivery configurations, appointment information/availability, etc. The user data 15b can be information relating to the user, including, for example, name, age, address, contact information, financial information, preferences, etc. Similarly, in the context of an educational institution, the user data 15b can include educational background data, e.g., high school/college/graduate school accomplishments, grade-point-averages (GPAs), educational preferences, etc. The other data 15c may be other data stored by appointment system 5 that is needed by the appointment system 5. It is to be appreciated that different desired levels of education may require different types of data. For example, a 2-year tech degree, a 4-year college, a vocational school, and the like, to name a few, may require different types of data from each other in regards to a potential target or enrollee.

The appointment system 5 operatively connects, either directly and/or indirectly via the network 50 to one or more institutions 40a, 40b, . . . 40N. In exemplary embodiments, the appointment system 5 may provide a web portal, APIs, downloadable application, and/or other communications methods to interface with the one or more institutions 40. For example, an institution 40 may register and/or sign up with the appointment system via the web portal, which may be implemented via the data services engine 20a.

The appointment system 5 may also operatively connect with one or more web properties 60a, 60b, . . . , 60N, via the network 50. The one or more web properties 60, may rely, use, and/or implement one or more of the services or components of the appointment system 5, such as the engines 20.

Figure 2:
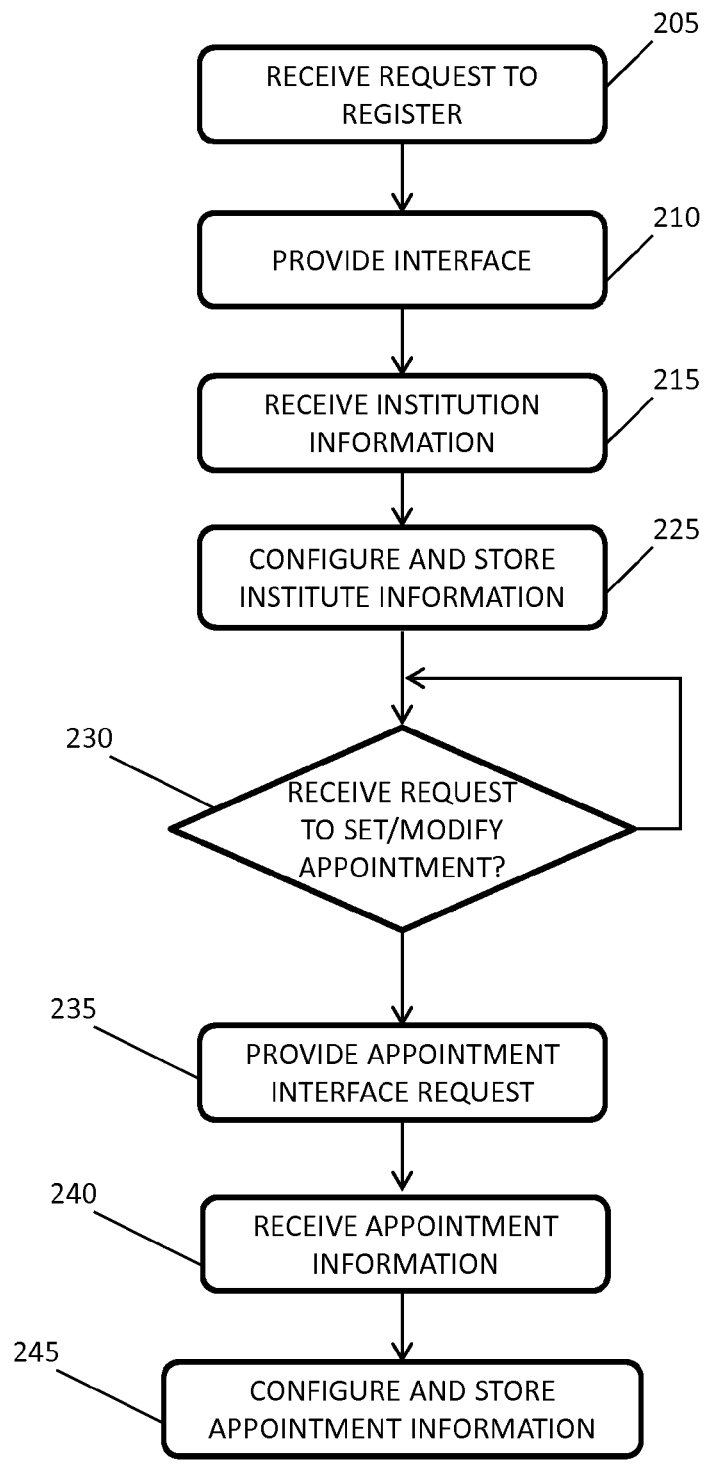
FIG. 2 is a flow chart illustrating an exemplary method for adding an educational institution to an education appointment system according to an exemplary embodiment of the present disclosure.

FIG. 2 illustrates a flowchart for registering an educational system with the appointment system 5, according to an exemplary embodiment of the present disclosure. In step 205, the appointment system 5 receives a request to register from an institution. This request can be received from an institution through any suitable means, such as, application interface, web interface, email, text message, phone call, fax, etc. For example, an institution 40 may connect via one or more of the web properties 60 affiliated or associated with the appointment system 5. The web property, e.g., a web page/site, may allow an institution to transmit a registration request to the appointment system 5. At step 210, the appointment system 5 provides an interface allowing institutions 40 to provide the required registration information. The interface may include one or more fields, drop-down boxes, or other means for institutions to provide and transmit information to the appointment system 5.

At step 215, the appointment system 5 obtains the registration information about the institution. In embodiments, the registration information may be received from the institutions and/or its agents via third party systems, such as websites or browsers, etc. In the context of an education institution, information related to campus locations, tuition prices, offered programs, etc., may comprise some of the information obtained by the appointment system 5. An educational institution can also specify target criteria such as business rules for generating matches, e.g., rules related to GPA requirements, graduation year, geography, interests, etc., in order to determine/find proper users or potential enrollees. The appointment system 5 can receive the institution information through any suitable means. For example, a representative or authorized individual affiliated with the institution can manually submit the required information to the appointment system 5. In some embodiments, an application, such as a web crawler or the like may manually retrieve and transfer the requisite information from the institution to the appointment system 5.

After obtaining the information regarding the institution, at step 225 the appointment data services engine 20a may finalize the initial registration process by configuring and storing the registration information for subsequent use. For example, the registration information may be combined with prior information, such as, for example, by updating, modifying, and/or replacing such prior information.

At step 230, the registering institution may request to set, provide, and/or modify the appointment information associated with the institution 40. Such requests may be submitted and received at any time after the registration information is received and stored. In response to receiving such a request, at step 235, the appointment system 5 may provide an appointment interface for receiving appointment information with the institution 40. At step 240, the appointment system 5 receives appointment information from the institution 40. In exemplary embodiments, the interface can allow an institution to electronically upload appointment information to the appointment system 5, such as from one or more computers associated with the institution 40. In exemplary embodiments, an appointment interface may allow for the manual entry or manual modification of the appointment information. Appointment information may include the available appointment times, locations, representatives information, campus information, programs, etc. In some exemplary embodiments, the appointment information may specify information regarding face-to-face appointments and/or non-face-to-face appointments, e.g., a telephone appointment, video web appointment, instant messaging, etc. At step 245, the appointment system 5 may configure and store the appointment information for subsequent use.

Figure 3:
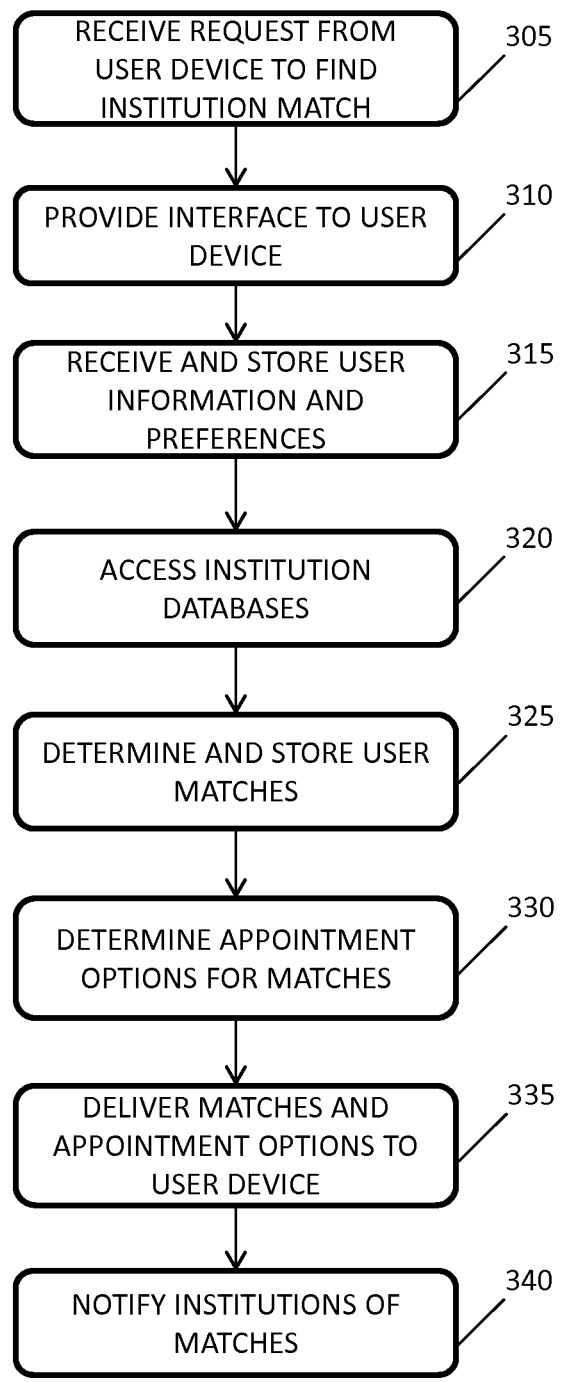
FIG. 3 is a flow chart illustrating an exemplary method for providing leads and/or appointments according to an exemplary embodiment of the present disclosure.

In exemplary embodiments, the appointment system 5 facilitates connecting institutions, such as colleges, universities, or other education institutions to users such as potential enrollees. FIG. 3 illustrates, according to an exemplary embodiment, a flow chart for providing institution matches to users.

At step 305, the appointment system 5 receives a request from a user device 30 to find a match. The user device 30 may send a request through any suitable means, such as through a web site, an application, an application running on a computing device, email, text messaging, telephone/voice messaging, and the like, to name a few. For example, a user device 30 may access a website affiliated or associated with the appointment system 5 for providing matches for educational institutions. At step 310, an interface is generated or provided on the user device, such as through a website or by an application running on the user device 30. The interface may allow a user to register with the appointment system 5 and provide personal information, e.g., name, address, age, as well as provide background information needed for a match. Referring back to the educational context, a user may provide highest education degree completed, degree type, educational preferences, etc.

Figure 5A:
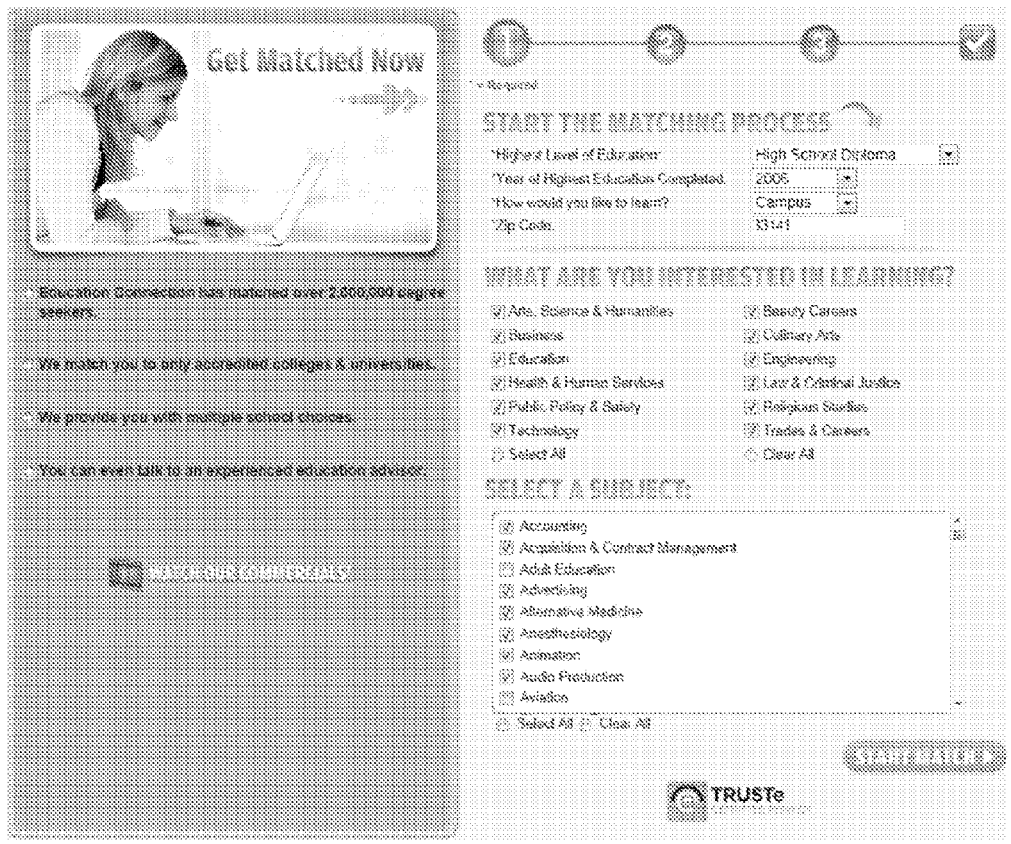
FIGS. 5A-5I show exemplary screenshots of interfaces according to an exemplary embodiment of the present disclosure.
Figure 5B:

FIGS. 5A-5B, show according to an exemplary embodiment, exemplary screenshots of an interface implemented on a website associated with the appointment system 5. As shown in FIG. 5A, a user may provide educational background information and education preferences, while FIG. 5B shows that a user may provide personal background information.

In exemplary embodiments, it may not be necessary for a user to provide information in order to set up an appointment. In this regard the user may directly select an educational institution without any or with little background information provided.

Figure 5C:
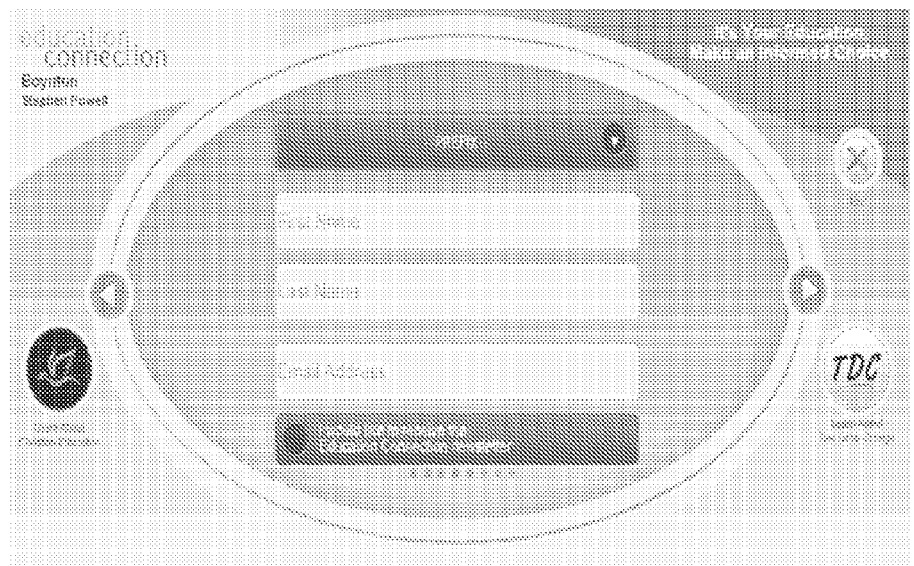
Figure 5D:
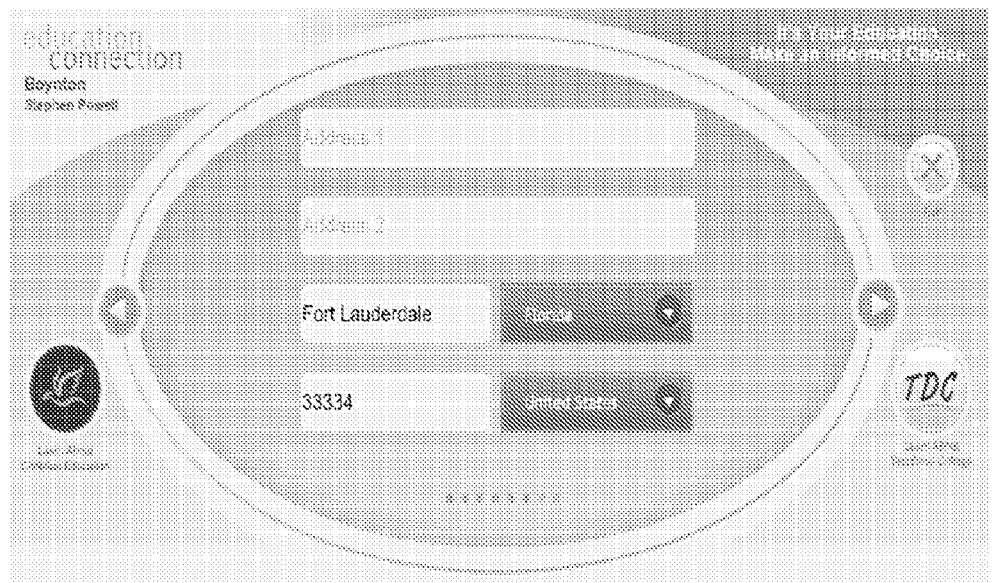
Figure 5E:
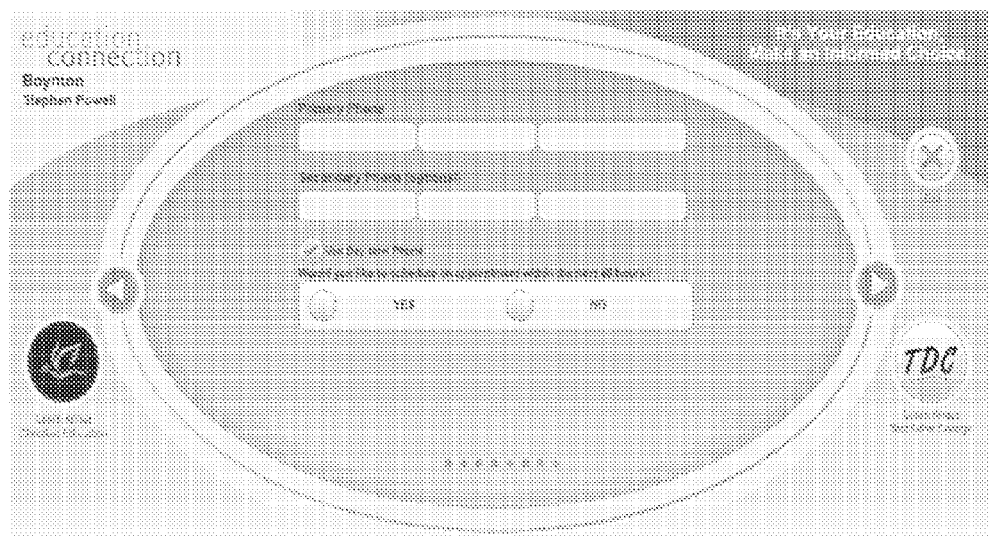

FIGS. 5C-5E show according to an exemplary embodiment, an exemplary series of alternative screenshots of an interface implemented on a website or a device associated with the appointment system 5. For example, FIGS. 5C-5E, show interfaces allowing an individual to provide identifying, address, and/or contact information.

Figure 5F:
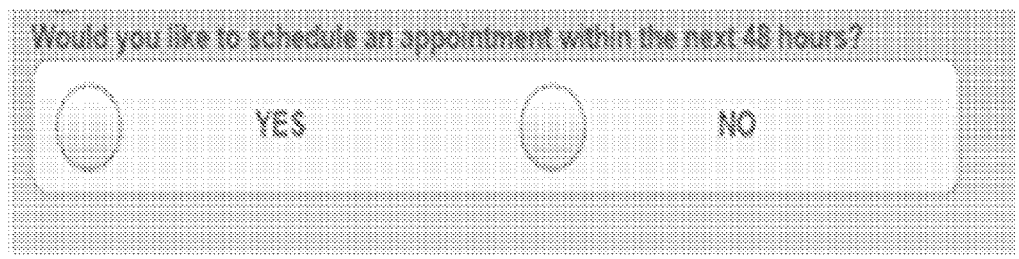
Figure 5G:
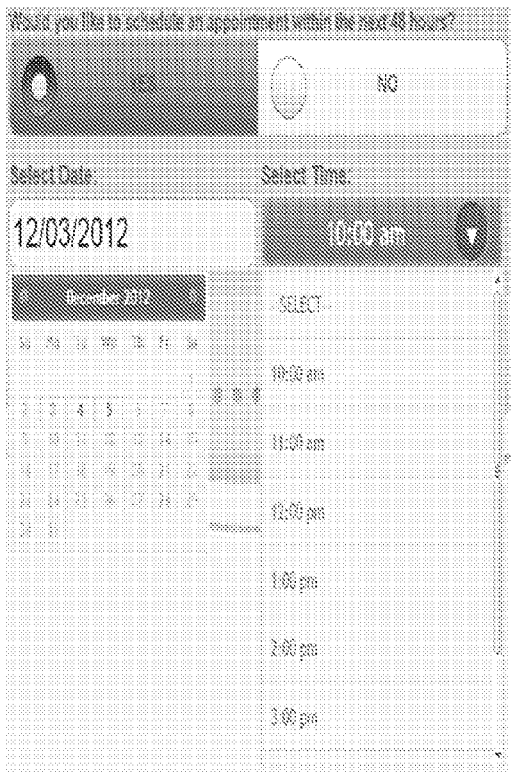
Figure 5H:
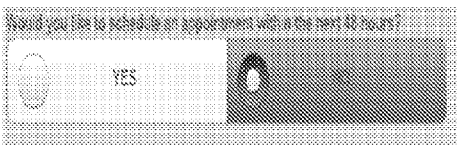

FIGS. 5F-5H show according to an exemplary embodiment, another exemplary series of screenshots relating to scheduling an appointment. FIG. 5F, shows an interface prompting an individual to indicate whether they wish to have an appointment in the next 48 hours. If the individual indicates yes, then as shown in FIG. 5G, the interface may allow the individual to choose a date/time for an appointment. FIG. 5H shows the interface after the individual has or selected the option indicating they do not wish to set an appointment in the next 48 hours.

Figure 5I:
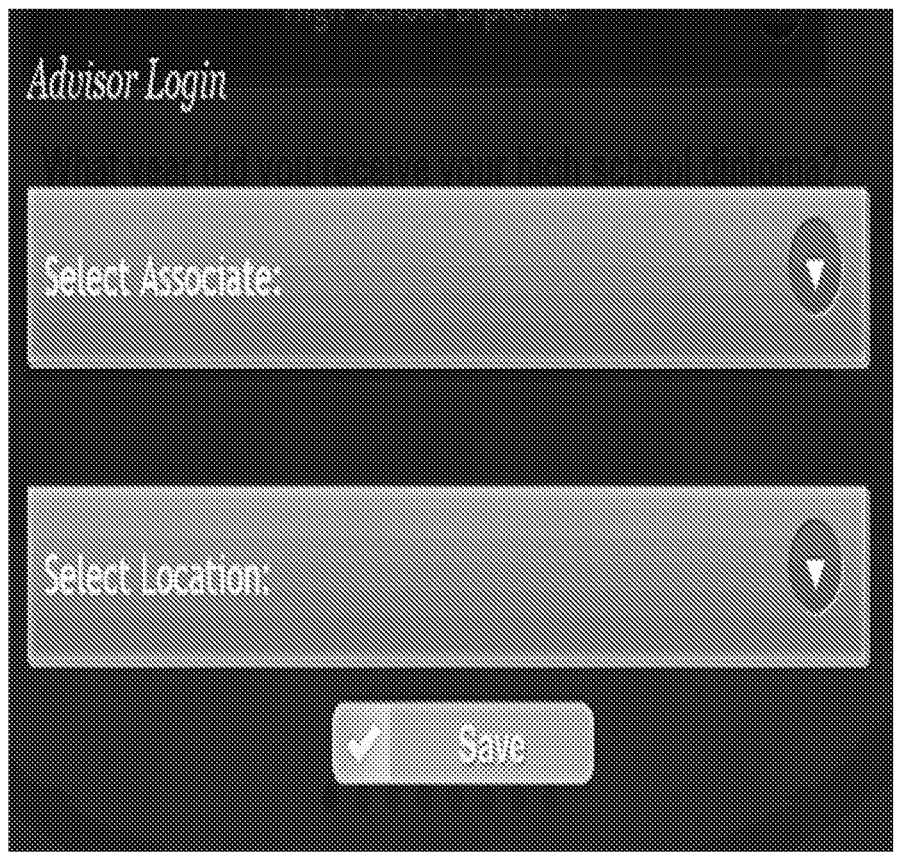

FIG. 5I shows according to an exemplary embodiment, an exemplary screenshot of an interface implemented on a device at a kiosk. The interface may allow an individual (applicant/lead) to choose an associate with whom to deal and/or choose a desired location.

At step 315, the appointment system 5, obtains user information, such as by receiving, directly or indirectly from the user device, and storing the user information in the electronic databases 15. At step 320, the appointment system 5 accesses the previously stored institution information. Based at least in part on the received user information and accessed institution information, at step 325 the appointment system 5 determines one or more matching institutions, if any. A record of these matches with respect to the particular user can be stored in the electronic databases 15. The appointment system 5, at step 330, determines available appointment options for the user based on the user information and the determined matching institutions. In exemplary embodiments, the appointment system determines one or more matching sponsored institutions, which may be designated or prioritized for display to the user device.

Figure 6A:
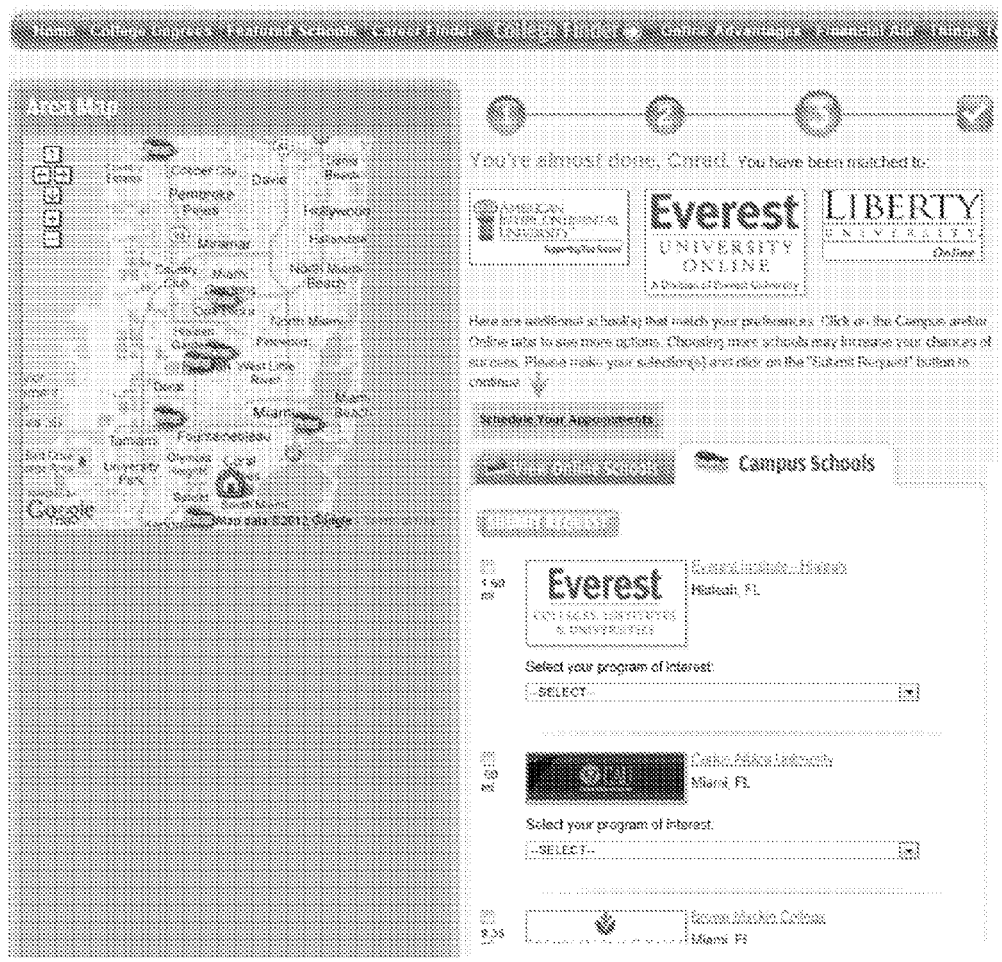
Figure 6B:
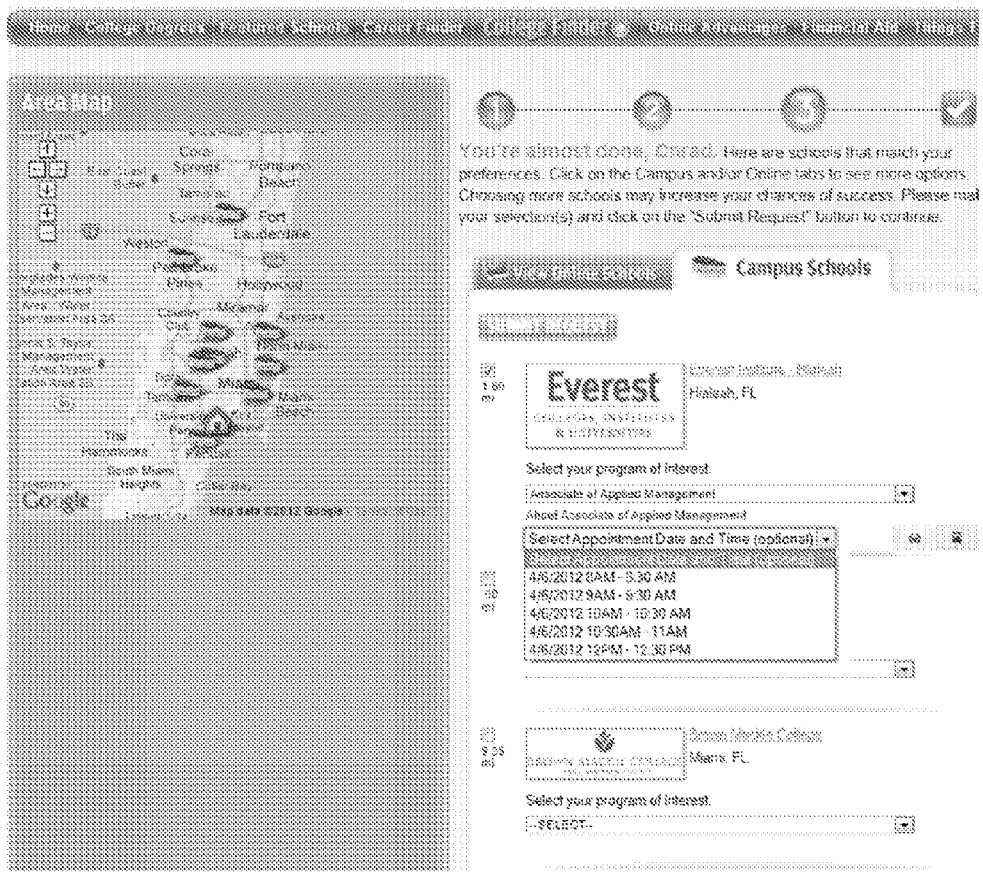

At step 335, the appointment system delivers the appointment matches and any associated appointment options to the user device, such as through an interface on a website. FIG. 6A shows, according to an exemplary embodiment, an exemplary screenshot of educational matches in response to a user who has supplied user information to the appointment system 5. FIG. 6B shows, according to an exemplary embodiment, the interface of FIG. 6A where a drop-down menu associated with one of the education matches has been selected to reveal a list of appointment options. At step 340, the appointment system 5 notifies the matching institutions regarding the determined match with the user.

Figure 4:
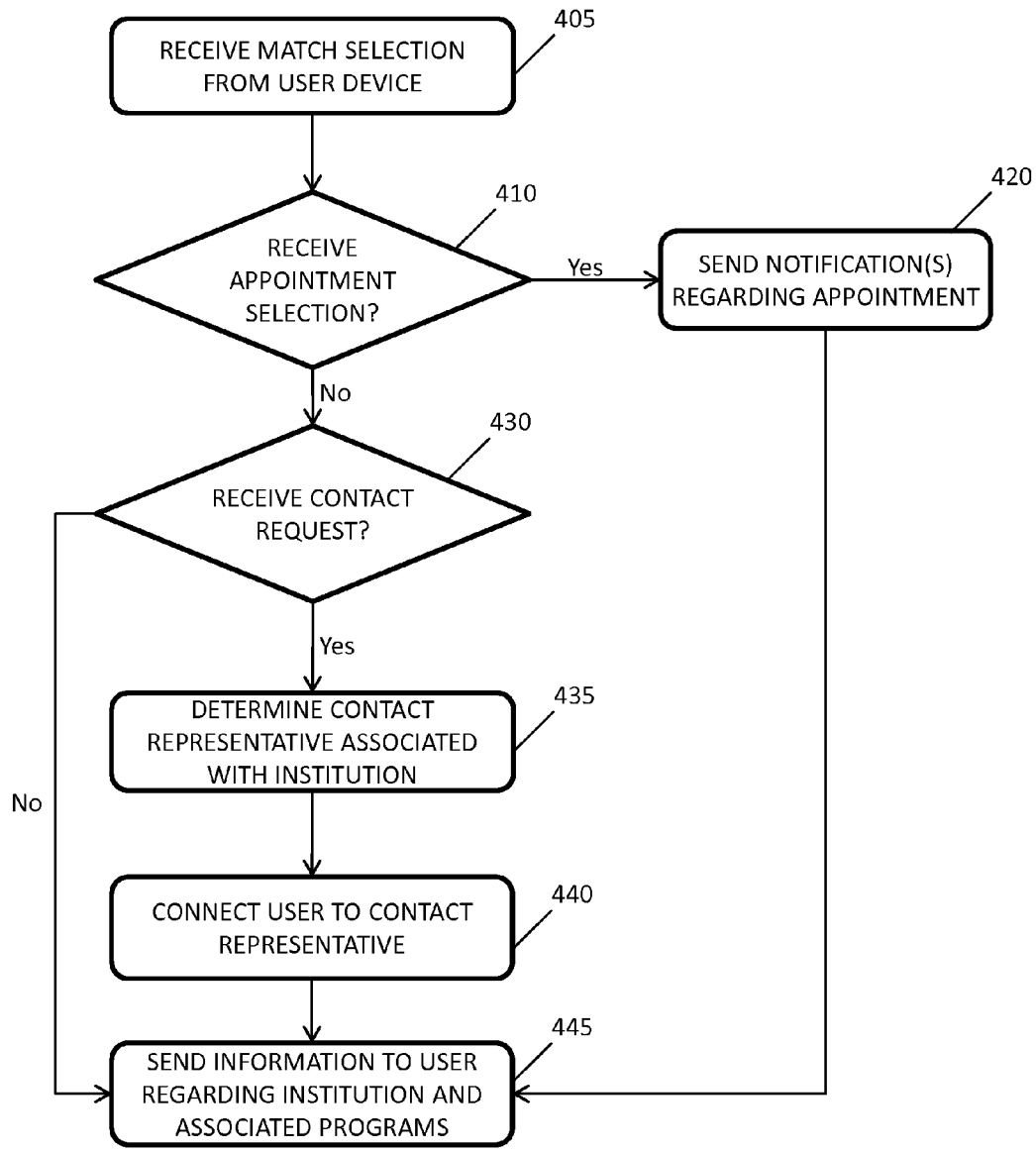
FIG. 4 is a flow chart illustrating an exemplary method for connecting matching users and institutions according to an exemplary embodiment of the present disclosure.

FIG. 4 illustrates, according to an exemplary embodiment, a flow chart for providing connections between matching users and institutions. In such a scenario, the appointment system 5 may have already determined and provided to a user device 30, institution matches. The user device 30 may display the match information in an interface, such as, for example, as in the exemplary screenshot of FIG. 6A. At step 405, the appointment system 5 receives a user selection of one or more of the matches. The user can select a match and may also select one or more further options associated with such a match. For example, referring to FIG. 6B, a user has made a selection by checking a box associated with the "Everest Institute". From a drop-down box, the user also selects the "Associate of Applied Management" program. At step 410, the appointment system 5 receives an appointment selection from the user device 30.

As previously discussed, FIG. 6B shows an exemplary screenshot with a drop-down box populated with institution information for selecting appointment options. If an appointment option is selected, then at 420, the appointment system 5 sends one or more notifications to the user regarding the appointment, such as the details, location, directions, contact person(s), etc. The appointment system 5 may send a first notification via the interface after an appointment selection and/or may send one or more reminder notifications. For example, the appointment system 5 may send reminder notifications to the user device 30 using email, text messages, and/or automated phone calls, etc. In yet another example, the appointment system may send a calendar appointment, such as an Outlook appointment, regarding the scheduled appointment.

In some situations, a user may desire information regarding the provided match(es) but may not wish, at least at that time, to schedule an appointment. If a user does not select an available appointment, then at step 430, the appointment system 5 determines if the user wishes to contact a representative of a selected match. The user, via the user device 30 can send an indication that they desire to communicate with one or more matching institution's representative. At step 435, the appointment system 5 determines the contacts associated with the matching institution. At step 440, the appointment system 5 connects or facilitates the connection of the user to the determined contact person(s). The appointment system 5 may connect the user through any suitable means, such as through text messaging, instant messaging, phone calls, video chat, and the like, to name a few.

After facilitating or providing a connection between a user and representative, and/or after receiving an appointment selection, the appointment system 5, at step 445, sends to the user or user device 30 information regarding the selected matching institution. For example the appointment system 5 can send to the user device information regarding the matching institution and programs, tuition costs, campus information, location information etc.

In an exemplary embodiment, a user may be provided the option to schedule an appointment to connect (e.g., teleconference, email, text, instant message, etc.) with a third party system or representative thereof who is not affiliated with the selected education institution. For example, a user may be connected to a third party representative such as, for example, an educational advisor/expert. The third party system and/or the representative can be associated and/or affiliated with the appointment system 5. In such situations, the user may not be provided and/or have access to all the same information in comparison to situations when connected to a representative of the education institution. Further, in some embodiments, the system, after finishing an appointment or session with a third party representative, the system may connect and/or direct the user to the education institution. For example, the system 1 thereafter may allow the user to thereafter set up an appointment with the institution in accordance with embodiments described herein.

Figure 6C:

If a user does not select an appointment, the appointment system 5 may save and store the matches so as to allow a user to schedule an appointment at a subsequent time without having to re-enter information. In some exemplary embodiments, the appointment system 5 may provide directions to the institution in the case of a scheduled face-to-face appointment. As shown in FIG. 6C, the appointment system 5 can rely on third-party services, such as, for example, Google Maps, Yahoo Maps, Apple Maps, etc. to provide locations and/or directions to the user.

In exemplary embodiments, the appointment system 5 collects data and statistics about the users of the appointment system 5. The collected information and statistics can be included in generated reports which the appointment system 5 can provide to the participating institutions. The collected information may contain information that is helpful in determining which factors determine interest in a particular institution and/or competitor institutions. The reports may be generated or provided on demand or on a scheduled basis to the one or more institutions.

It will be understood that that any of the above steps and/or elements can be combined, separated, in any combination and/or separation thereof, and/or taken in any order. For ease, some of the steps are described as being sequential and/or in order. This is merely for ease and is not in any way meant to be a limitation.

Now that exemplary embodiments of the present disclosure have been shown and described in detail, various modifications and improvements thereon will become readily apparent to those skilled in the art.

What is claimed:

1. A method comprising:
   (a) receiving, at one or more computers from a requestor device, a request for one or more educational institution matches;
   (b) obtaining, at the one or more computers via an interface, user information associated with a user of the requestor device, the user information comprising
      (1) user identification data including information identifying the user;
      (2) demographic data including information identifying demographic data related to the user;
      (3) location data including information indicating one or more addresses associated with the user;
      (4) education data including information indicating educational background of the user;
      (5) education preference data including information indicating educational preferences for the user; and
      (6) contact data including information indicating contact information for the user;
   (c) accessing, by the one or more computers, one or more electronic databases stored on one or more non-transitory computer-readable storage media and operatively connected to the one or more computers, the one or more databases comprising information for a plurality of educational institutions, including for the respective institutions:
      (1) user educational identification data including information identifying the user;
      (2) education location data including information identifying one or more locations associated with the respective educational institution;
      (3) education program data including information related to education programs associated with the respective educational institution;
      (4) education requirements data including information indicating admission requirements and admission preferences for respective educational institution;
      (5) representative data including information indicating representatives for the respective educational institution; and
      (6) appointment data including information indicating scheduled and available times;
   (d) determining, by the one or more computers, based at least in part on the obtained user information, one or more educational institutions as matches;
   (e) providing, by the one or more computers, the one or more education institution matches as selectable options to the requestor device via the interface;
   (f) transmitting, by the one or more computers to one or more computers associated with each of the matched educational institutions, a notification to each of the educational institution matches, the notification including a message indicating that the educational institution matches a prospect;
   (g) obtaining, at the one or more computers from the requestor device via the interface, a selection of an educational institution;
   (h) providing, by the one or more computers to the requestor device, an option to schedule an appointment with a third party representative that is not affiliated with the selected educational institution;
   (i) receiving, at the one or more computers from the requestor device, a request to schedule an appointment with the third party representative;
   (j) determining, by the one or more computers, one or more available appointment times for the selected educational institution;
   (k) transmitting, by the one or more computers, a request to select one or more appointment times for the selected educational institution;
   (l) upon the condition that an appointment time is selected, transmitting, by the one or more computers to one or more computers associated with the selected educational institution, a confirmation-seeking message requesting confirmation of the selected appointment time with a designated representative of the selected educational institution;
   (m) obtaining, at the one or more computers, a message indicating confirmation of the appointment time by selected educational institution with a designated representative;
   (n) transmitting, by the one or more computers, a confirmation message to the requestor device confirming the date, time, location;
   (o) transmitting, by the one or more computers to the requestor device via the interface, directions to the selected educational institution; and
   (p) transmitting, by the one or more computers, a request to a third party service to cause a map illustrating the directions to be displayed on the interface on the requestor device.

2. The method of claim 1, further comprising:
   (q) transmitting, by the one or more computers to the requestor device, a reminder notification regarding the confirmed appointment.

3. The method of claim 1, wherein the obtained user's education data comprises at least one of a high school, college, or postgraduate school attendance dates.

4. The method of claim 1, the education data further comprises one or more degrees completed by the user to the extent they exist.

5. The method of claim 3, the education data further comprises the user's grade point average in at least one of high school, college, or postgraduate school.

6. The method of claim 1, wherein at least one of the provided matches is sponsored match.

7. The method of claim 1, wherein the third party representative is an educational advisor.

8. The method of claim 1, further comprising the steps of:
   (r) upon the condition that an appointment time is not selected, receiving, at the one or more computers from the requestor device, a request to contact a representative of the selected educational institution;
   (s) determining, at the one or more computers, the representative of the selected educational institution;
   (t) connecting, by the one or more computers, the determined representative with the requestor device.

9. A system comprising:
   one or more data processing apparatus; and
   a non-transitory computer-readable medium coupled to the one or more data processing apparatus having instructions stored thereon which, when executed by the one or more data processing apparatus, cause the one or more data processing apparatus to perform a method comprising:
   (a) receiving, from a requestor device, a request for one or more educational institution matches;
   (b) obtaining, via an interface, user information associated with a user of the requestor device, the user information comprising (1) user identification data including information identifying the user;
(2) demographic data including information identifying demographic data related to the user;
(3) location data including information indicating one or more addresses associated with the user;
(4) education data including information indicating educational background of the user;
(5) education preference data including information indicating educational preferences for the user; and
(6) contact data including information indicating contact information for the user;
(c) accessing one or more electronic databases stored on the one or more non-transitory computer-readable storage media, the one or more databases comprising information for a plurality of educational institutions, including for the respective institutions:
(1) user educational identification data including information identifying the user;
(2) education location data including information identifying one or more locations associated with the respective educational institution;
(3) education program data including information related to education programs associated with the respective educational institution;
(4) education requirements data including information indicating admission requirements and admission preferences for respective educational institution;
(5) representative data including information indicating representatives for the respective educational institution; and
(6) appointment data including information indicating scheduled and available times;
(d) determining, based at least in part on the obtained user information, one or more educational institutions as matches;
(e) providing the one or more education institution matches as selectable options to the requestor device via the interface;
(f) transmitting to one or more computers associated with each of the matched educational institutions, a notification to each of the educational institution matches, the notification including a message indicating that the educational institution matches a prospect;
(g) obtaining, from the requestor device via the interface, a selection of an educational institution;
(h) determining one or more available appointment times for the selected educational institution;
(i) obtaining a selection of one or more appointment times for the selected educational institution;
(j) transmitting, to one or more computers associated with the selected educational institution, a confirmation-seeking message requesting confirmation of the selected appointment time with a designated representative of the selected educational institution;
(k) obtaining a message indicating confirmation of the appointment time by selected educational institution with a designated representative;
(l) transmitting a confirmation message to the requestor device confirming the date, time, location;
(m) transmitting, to the requestor device via the interface, directions to the selected educational institution; and
(n) transmitting a request to a third party service to cause a map illustrating the directions to be displayed on the interface on the requestor device.

10. The system of claim 9, further comprising:
(o) transmitting, by the one or more computer's to the requestor device, a reminder notification regarding the confirmed appointment.

11. The system of claim 9, wherein the obtained user's education data comprises at least one of a high school, college, or postgraduate school attendance dates.

12. The system of claim 9, wherein the education data further comprises one or more degrees completed by the user to the extent they exist.

13. The system of claim 11, wherein the education data further comprises the user's grade point average in at least one of high school, college, or postgraduate school.

14. The system of claim 9, wherein at least one of the provided matches is a sponsored match.

* * * * *